United States Patent [19]
Hedlund et al.

[11] Patent Number: 5,413,346
[45] Date of Patent: May 9, 1995

[54] DOMINANT EYE SIGHT TRAINING APPARATUS

[76] Inventors: George Hedlund, 2004 W. Wind, Santa Ana, Calif. 92704; Thad T. Owens, 2749 Adelaide Ct., Riverside, Calif. 92506

[21] Appl. No.: 38,261

[22] Filed: Mar. 29, 1993

[51] Int. Cl.$^6$ ............................................. A63B 69/36
[52] U.S. Cl. .................. 273/187.2; 273/187.6; 351/51
[58] Field of Search ................ 2/10, 15; 351/46, 47, 351/51, 52, 57, 58, 45, 155; 434/252; 273/187.2, 187.6

[56] References Cited

U.S. PATENT DOCUMENTS

| | | | |
|---|---|---|---|
| 2,045,399 | 6/1936 | McMurdo | 273/187.2 |
| 3,487,549 | 1/1970 | Engesser | 273/187.2 |
| 4,531,743 | 7/1985 | Lott | 273/187.2 |
| 4,852,882 | 8/1989 | Otsuta et al. | 273/187.2 |
| 5,171,152 | 12/1992 | McCleery | 273/187.6 |

FOREIGN PATENT DOCUMENTS 2125298 3/1984 United Kingdom ............. 273/187.2

*Primary Examiner*—Mark S. Graham
*Attorney, Agent, or Firm*—Edward E. Roberts

[57] ABSTRACT

An eye dominant training device comprising a track sewn into the front brim of a sun visor that accepts a wrap around clear plastic material, referred to as a graphic display shield. The shield slides in and out of the track for easy replacement. The shield when placed in the track covers the eyes completely but does not go down beyond the bottom of the nose or below the bottom of the ears at the wrapped position. The shield has a clear generally rectangular window for the placement of master and testing graphic displays which may be in the form of decals. The testing graphic displays are sued for determining present eye dominance if any. The utilization graphics display includes one circle in front of either eye for the sole purpose of viewing a target through the circle with a line matrix including one tilted horizontal line with several vertical lines placed next to the circle. The circle is used as an object focusing device for the eye being trained. When looking through the circle the viewed object is placed in the center of the circle. Outside of the clear part of the rectangle on the shield, the plastic is blackened out to force the wearer to concentrate on the use of the device. The present invention is described for the use in the sport of golf but can be used in other sports that relate to eye dominance training or any other area where this eye dominance would be required.

28 Claims, 7 Drawing Sheets

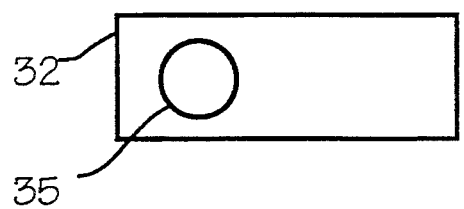
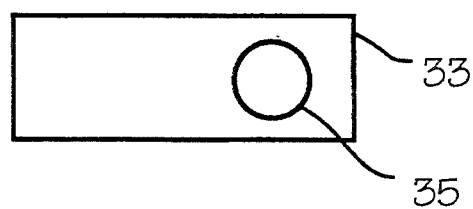
FIG. 4a　　　　　　FIG. 4b
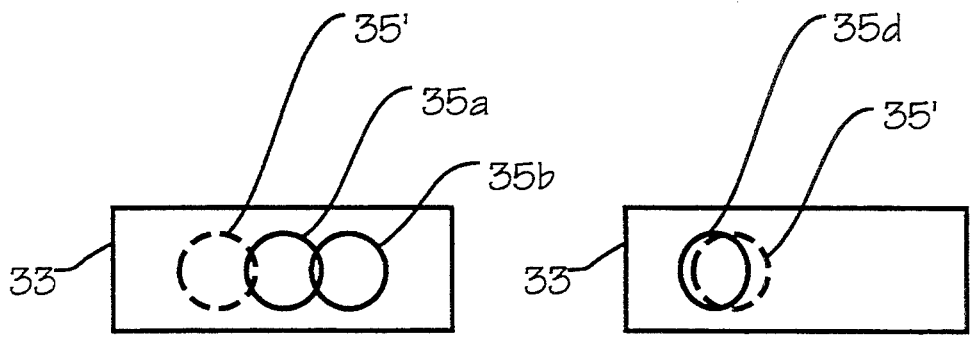
FIG. 4c　　　　　　FIG. 4d
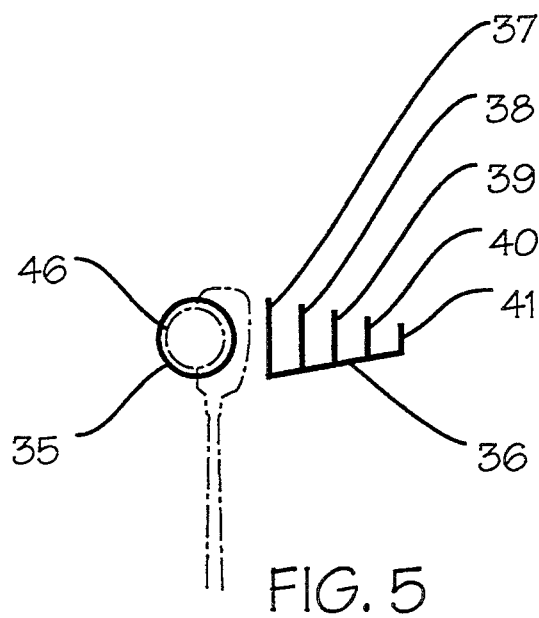
FIG. 5

DOMINANT EYE SIGHT TRAINING APPARATUS

BACKGROUND OF THE INVENTION

The background of the invention will be discussed in two parts.

1. Field of the Invention

This invention relates to golf training apparatus, and more particularly to a golf sight training apparatus including a shield or lens member attachable to a sun visor or brim of a golf cap for enabling one to determine and concentrate on the sight eye during practice.

2. Description of the Prior Art

Various golf training devices have been devised, such as mats having position markings thereon for foot placement and devices for attachment to the head or a hat, for teaching keeping the eye on the ball and non-movement of the head during the golf swing.

One such device comprises a flat piece of material, such as plastic or cardboard, attached to the brim of a cap by clips, with the material provided with a peephole to train the golfer to keep his eye on the ball.

Another such device includes a pair of eyeglasses for golfers having laterally slidable vision screens mounted in tracks in each eyeglass opening. Each vision screen has a transparent upper portion and a lower opaque portion with a vertical slit, the golfer adjusting the slit for each eye for viewing the ball through the adjusted slits.

Another such sighting device for teaching a golfer to keep the head motionless includes eyeglasses having a circular target sight on each lens. The lenses may be transparent upper portion and a lower opaque so that when using two sights, the sights blend to appear as a single hazy circular shadow encircling the ball.

Such prior art golf training devices do not take into consideration the fact that the vast majority of people have a dominant eye. Furthermore, such devices are constructed with the belief that the head must remain motionless. In the golf swing there are several factors that relate to the head, shoulders, and body position during back swing and follow through that have been widely used and quite effectively. There is one factor that is very important that has been talked about for several years but largely ignored. Most golfers are right handed and generally those people are also right eye dominant. However, with right handed golfers, the left eye is nearer the target. As a means of teaching one to keep the head still and keep the eye on the ball, for right handed golfers, some golf professionals teach cocking the head to the right when addressing the ball, thus placing the presumable dominant right eye in the position of having to look at the ball past the bridge of the nose.

When a golfer aligns himself to the correct position over a golf ball with his eye sight dominant from the wrong side, the dominant side will align the head in the wrong position, i.e., a line of sight from the left side being the correct one and one from the right side being wrong due to an angle instead of a straight line from the eye to the ball. Many golfers turn their heads to the right to align the head with the left eye pointing straight down, these golfers being naturally right handed. Left handed people do the same, but in the opposite direction. This assists in solving the problem of the position of the head at address, but it puts the head out of the proper position at address. This can cause all kinds of problems, such as swaying, jerking, shoulder roll and being too far forward in stance. Head movement is one of the most crucial areas to the golf swing. Other areas of this syndrome can also be explored. Training the eyes for sighting the shot is also crucial. Golf lessons that are given today teach, in more cases than not, that the golfer should stand to the ball, look at where he wants to hit the ball, place this in his conscious mind by seeing the shot occur, look at the ball and hit it. However, the target is just about blocked out before you get to the ball with your swing.

An object of the present invention is to help the golfer train his eyes to see the ball, and, with practice as the dominant eye is trained, eye knowledge will be translated to the brain.

Another object of the present invention is to provide a training apparatus in which eye dominance is located, eye dominance is trained, head movement is limited, stance of feet is shown, parallel head alignment is shown and track of back swing and tempos can be taught.

It is further object of the present invention to provide a method of training an eye to become more dominant over the other normally dominant eye and a method of teaching tempo and direction in a golfer's back swing and follow through. This can be applied to both a full swing or a putting stroke.

It is still another object of the present invention to provide a method of training that applies to other sports where eye dominance is required, such as hitting a ball, pitching a ball, or shooting a gun, by way of examples.

It is a still further object of the present invention to provide a method of training for head movement in the golf swing and focusing of concentration for the eyes to see the ball at impact.

SUMMARY OF THE INVENTION

The foregoing and other objects of the invention are accomplished by providing an optical device or dominant eye golf sight training shield for the purpose of training an eye to become dominant over the other eye during golf driving practice. The apparatus includes graphics within a viewing rectangle. The device comprises a golf cap or a sun visor with a sewn track in the cap or visor brim with a shield containing a graphic display shield which slides in or out of the sewn track. The shield containing the graphic display wraps around the wearer's face in front of the eyes and continues to the back of each ear, but not lower than the bottom of each ear and not lower than the bottom of the nose in the front of the face. The shield has a clear rectangular window with a circle for positioning in front of one eye and a line matrix imprinted adjacent to the circle for positioning in front of the other eye. The area outside of the window is blackened out to help the wearer with his or her concentration.

Other objects, features and advantages of the invention will become apparent from a reading of the specification when taken in conjunction with the drawings in which like reference numerals refer to like elements in the several views.

BRIEF DESCRIPTION OF THE DRAWINGS

FIGS. 4a and 4b are plan views of two eye test graphic displays, while FIGS. 4c and 4d show views through the eye test graphical displays;

FIG. 5 is the scene viewed by the user of the display of FIG. 2a when addressing a golf ball.

DETAILED DESCRIPTION OF THE PREFERRED EMBODIMENTS

Figure 1:
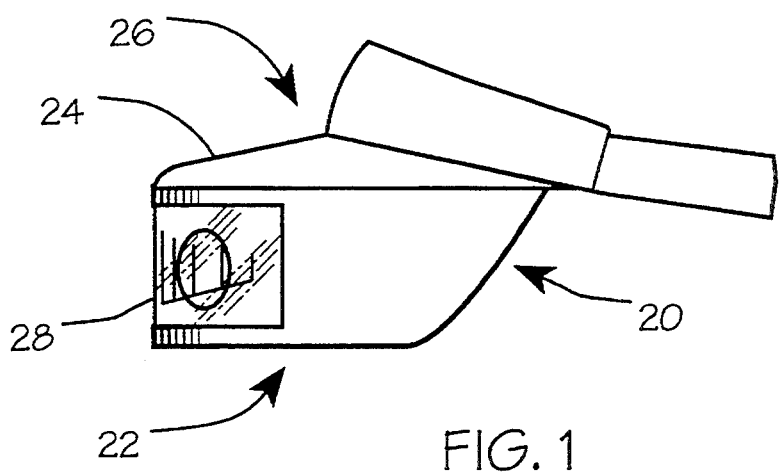
FIG. 1 is a side elevational view of the dominant eye golf sight training apparatus according to the invention.

Referring now to the drawings, and particularly to FIG. 1, there is shown a dominant eye golf sight training apparatus, generally designated 20, which includes a shield member, generally designated 22, for removable attachment to the underside of the periphery of the brim 24 of a sun visor 26 (or golfer's cap). The shield member 22 is elongate (See FIG. 6) and generally opaque (blackened out) or translucent with a transparent central generally rectangular transparent portion or window 28. The window 28, as will be described, is configured for receiving one of a plurality of graphic displays, such as dominant eye testing displays 30 and 31 of FIGS. 2a and 2b, respectively, or utilization graphic displays 32 and 33 of FIGS. 4a and 4b, respectively. The graphic displays 30–33 may be transparent decals for adhesive attachment to the shield 22 within the window 28. Alternatively, for a golfer of known eye dominance, the display may be formed as part of the shield 22.

The utilization graphic displays 30 and 31 are used for golfing and include a circle 35 adjacent one side thereof, left or right, depending on the eye dominance of the user. In the space adjacent the circle 35, there is a canted or inclined straight line 36 with orthogonal or perpendicularly oriented lines 37–41 emanating upwardly therefrom with the length of each line being graduated, that is, each line is shorter in length the greater the distance from the circle 35.

The combination of the circle 35 and the lines 36–41, when sighted through both eyes, serves as a reticula means for the target (ball) alignment, with the line 36 being used for club path while the vertical lines 37–41, which are spaced generally equally, are used for the speed of take away of golf club head, and serve an ancillary function of a reference point for foot placement which, in turn, translates to body position at address.

The majority of the surface of the shield 22 is preferable blackened for the golfer to eliminate and distraction.

The graphic displays 30–33 are transparent, as is the window 28 of the shield 22. For determining the dominant eye, the graphic displays 32 and 33 (FIGS. 4a and 4b) may be utilized, these displays having a single circle 35' positioned for placement in the line of sight of one eye or the other. These displays may also be utilized for other purposes such as target shooting with a pistol or the like.

By reference to FIGS. 4c and 4d, the utilization of the displays 32 and 33 will be described. FIG. 4c demonstrates, from the user's view, the picture that will be seen. In this figure, the circle 35' is depicted on the left in broken lines with the two solid line circles 35a and 35b representing the circles which would be seen by a right eye dominant viewer with both eyes open. FIG. 4d shows what the same viewer would see with the left eye closed (viewing through the right eye). The display circle 35' (in broken lines) appears to move left to the solid line position 35d and appears slightly elliptical. In use, for training the non-dominant eye, the next step is for the user to close both eyes and concentrate on the left eye opening only. With this thought in mind, the user opens both eyes, in sequence, while concentrating on seeing the circle with the left eye. For the sequence, the user first opens the left eye, and shortly thereafter the right eye, all the time concentrating on seeing the circle with the left eye. Repeating this exercise will train the left eye; the more it is practiced, the faster the results of the training. The end result will be that the user sees the circle in front of the left eye only, and the right eye will see the field of sight.

The graphic displays 30 and 31 have the tilted horizontal line 36, by means of which during take away, the golfer can concentrate on the club path by observing the movement of the head of the club relative to this line; while the graduated generally equally spaced vertical lines provide a point of reference for the speed of take away of golf club head to enable the golfer to acquire rhythm during the back swing. The canted horizontal line 36 is a reference for the line of the club path to insure concentration on the club travel in a plane or along a line from out to in.

Figures 2A, 2B:
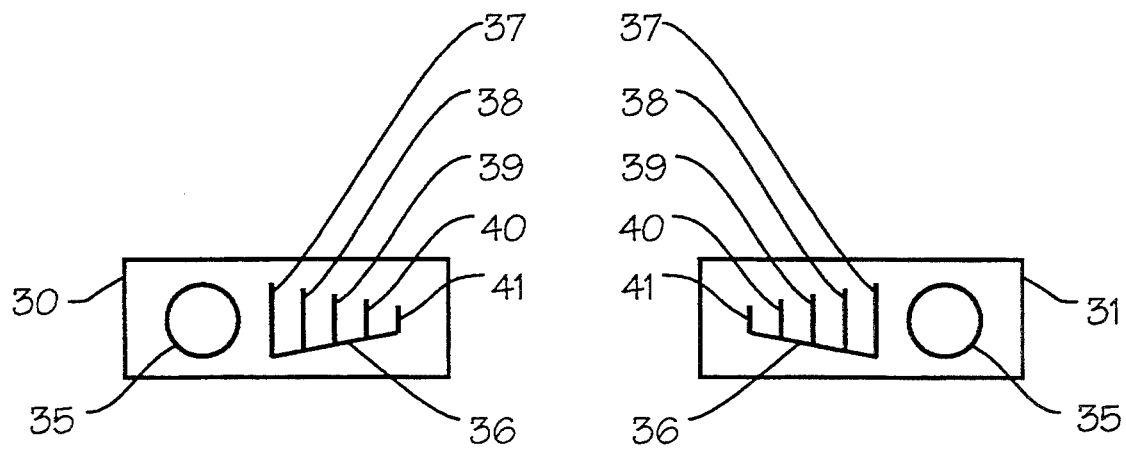
FIGS. 2a and 2b are plan views of the respective dominant left eye and dominant right eye master displays for use in the graphic shield of the dominant eye golf sight training apparatus of FIG. 1.
Figure 3:
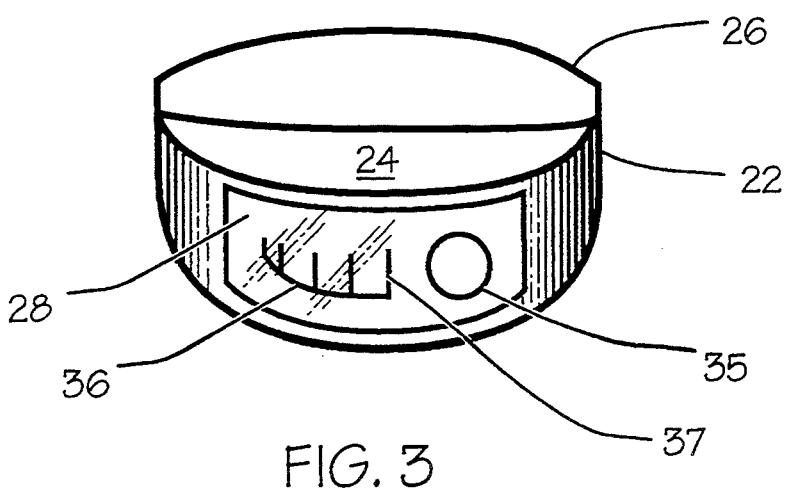
FIG. 3 is a front view of the graphic shield of FIG. 1 illustrating the dominant eye trainer and the lines of display for the tempo and direction of club head.

By way of explanation, the graphic display 30 in FIG. 2a shows the circle 35 on the left side, this being the observation or viewing position, that is, the circle 35 would be proximate the golfer's left eye and this display is for a right handed golfer. The intention is to provide a point of reference for the golfer to concentrate and focus on the ball through the left eye to train the left eye to have a measure of dominance during play of the game.

Figure 6:
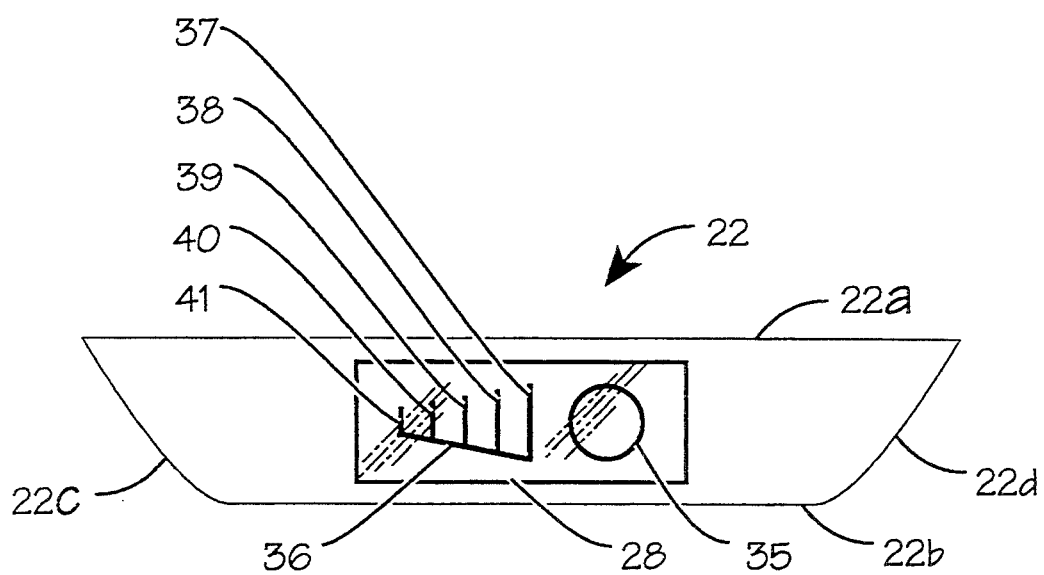
FIG. 6 is a plan planar view of the graphic display shield used in the apparatus of FIG. 1.
Figure 7:
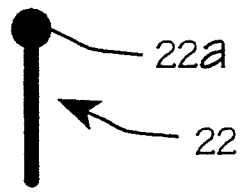
FIG. 7 is an end view of the graphic display shield of FIG. 6.

Prior to a detailed discussion of the use of the device, by reference to FIGS. 6 through 10, the details of construction will be described. As shown in FIG. 6, the shield 22 is elongate and a width sufficient to wrap around the front of the eyes of the user, with a length sufficient to continue to about the bottom of the nose of the user. Dimensionally, in use the shield 22 is sized to continue to the back of each ear, but not lower than the bottom of each ear and not lower than the bottom of the nose in the front of the face. The upper edge 22a (See also FIG. 7) is enlarged into a tabular edge configuration for attachment or detachment purposes. The lower edge has a first central edge portion 22b which is generally parallel to the upper opposite edge portion 22a, with the two side edge portions 22c and 22d being inclined or wedge-shaped. The surface between the edge portions 22a and 22b are the central portion of the shield 22 which includes the window 28 and is of a dimension suitable for matching the area of interest, that is the eyes of the user.

Figure 8:
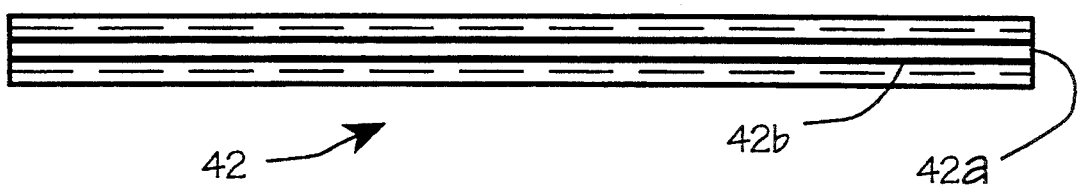
FIG. 8 is a bottom plan view of the attachment member for attaching the shield of FIG. 6 to the brim of a sun visor or cap.
Figure 9:
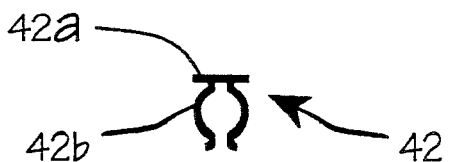
FIG. 9 is an end view of the attachment member of FIG. 8.
Figure 10:
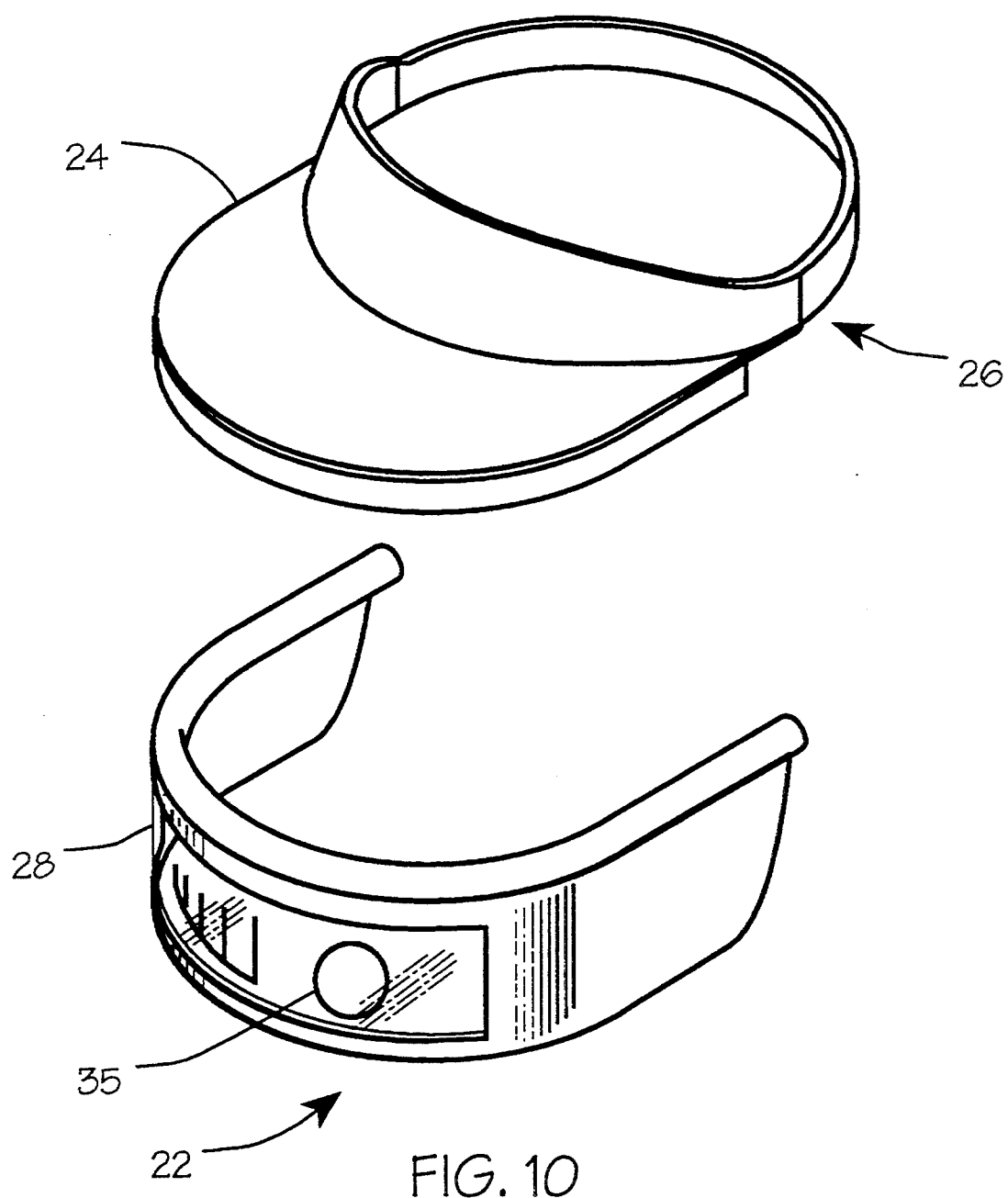
FIG. 10 is an exploded perspective view of the shield and cap of the apparatus of FIG. 1.

FIGS. 8 and 9 show the attachment member, generally designated 40, which includes a main ribbon portion 40a and a channel means 40b in depending relation therewith, the channel means having a formed slot matingly configured for slidingly receiving the tubular edge 22a of the shield 22 for attachment or removal. The member 40 may be attached to the under surface of the brim 24 of the visor or cap by any suitable means, such as sewing, adhesives, or Velcro strips. The upper edge 22a will be contoured roughly to the periphery or contour of the brim 24 and will be positioned symmetrically with respect thereto. The curvature of the edge 22a of the shield 22 keeps the shield 22 straight across the front brim 24 of the sun visor 26. The bottom edge portions 22c and 22d of the shield 22 allow the shield to be angled upward to remain above the bottom of the ears of the head. FIG. 10 shows the shield 22 position relative to the brim 24 of the visor 26.

Figure 11:
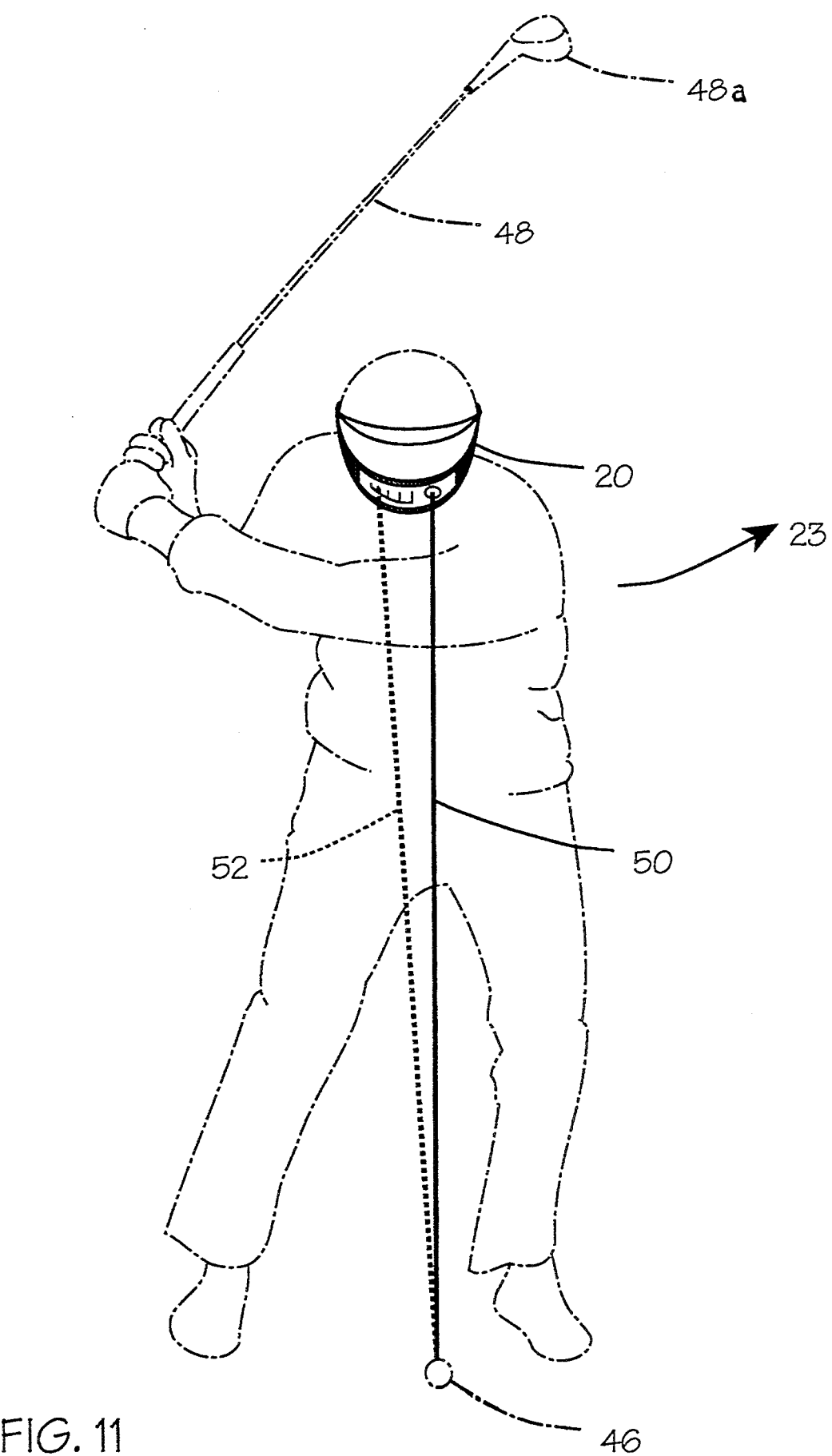
FIG. 11 is a front view of a golfer at the top of his back swing utilizing the training apparatus of FIG. 1.
Figure 12:
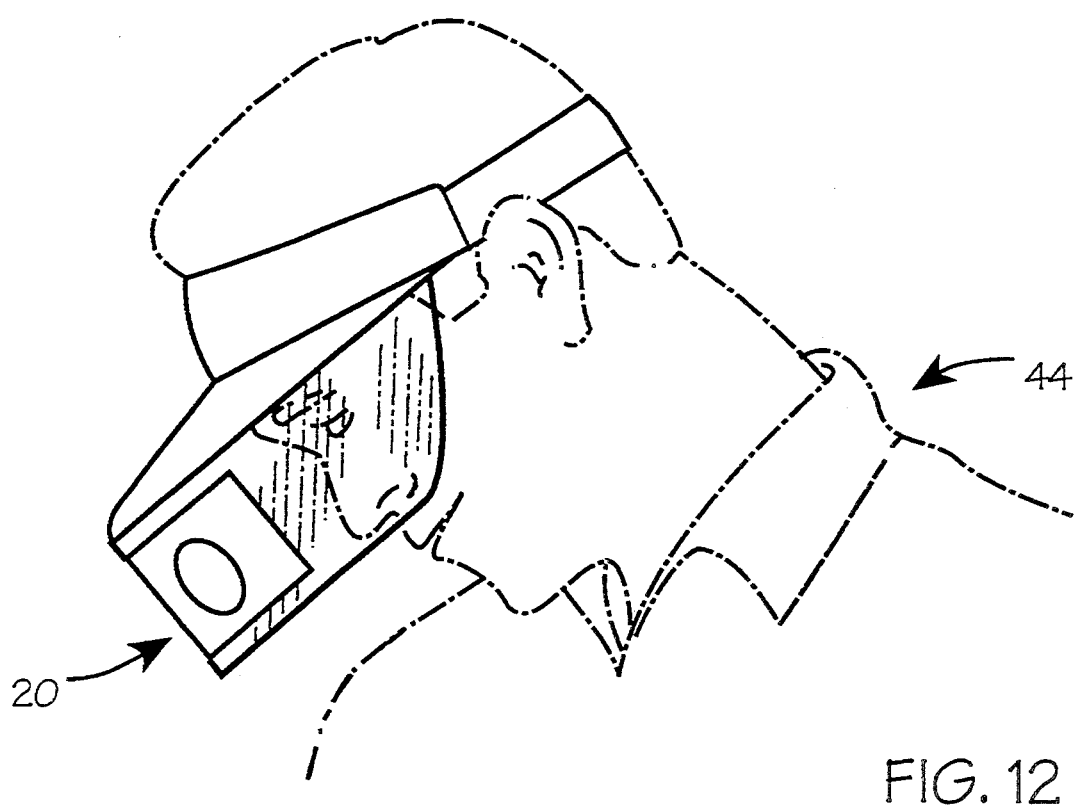
FIG. 12 is a side view of the head of the golfer of FIG. 11.

Referring now to FIGS. 11 and 12, there is shown a golfer or user 44 having the training apparatus 20 on his head, with the eyes concentrating on a golf ball 46 and the golf club 48 at the top of the back swing. A first solid line 50 is drawn from the left eye of the right handed golfer 44, with a second broken line 52 drawn from the right eye of the golfer 44. The line 50 represents the sight line through the circle 35 (See FIG. 6), while the broken line 52 represents the sight line from the right eye through the grid or matrix of lines 36-41 (See FIG. 6). This demonstrates the angular difference at stance between the eyesight difference of the right and left eye, that is, the angular difference of the right eye to the ball 46.

By way of explanation, the left eye, with the head straight shows a direct vertical line 50 of sight to the ball 46. The dotted or broken line 52 shows the angular difference of sight from a right eye dominance. Changing the dominance of the eye from the right eye to the left eye places the golfer in the correct address as well as the correct head position. During use, the purpose is for the golfer 44 to concentrate on positioning the ball 46 concentrically within the circle 35 as viewed through the left eye with the line 36 being used a reference line during club take away to promote consistent initial club head movement, with the graduated vertical lines 37-41 serving as a "speedometer," that is, to provide a mental reference for take away speed of movement of the club head. This establishes a solid take away, but if the golfer 44 wanted to be more upright he could keep the club movement below the line 36.

Figure 13:
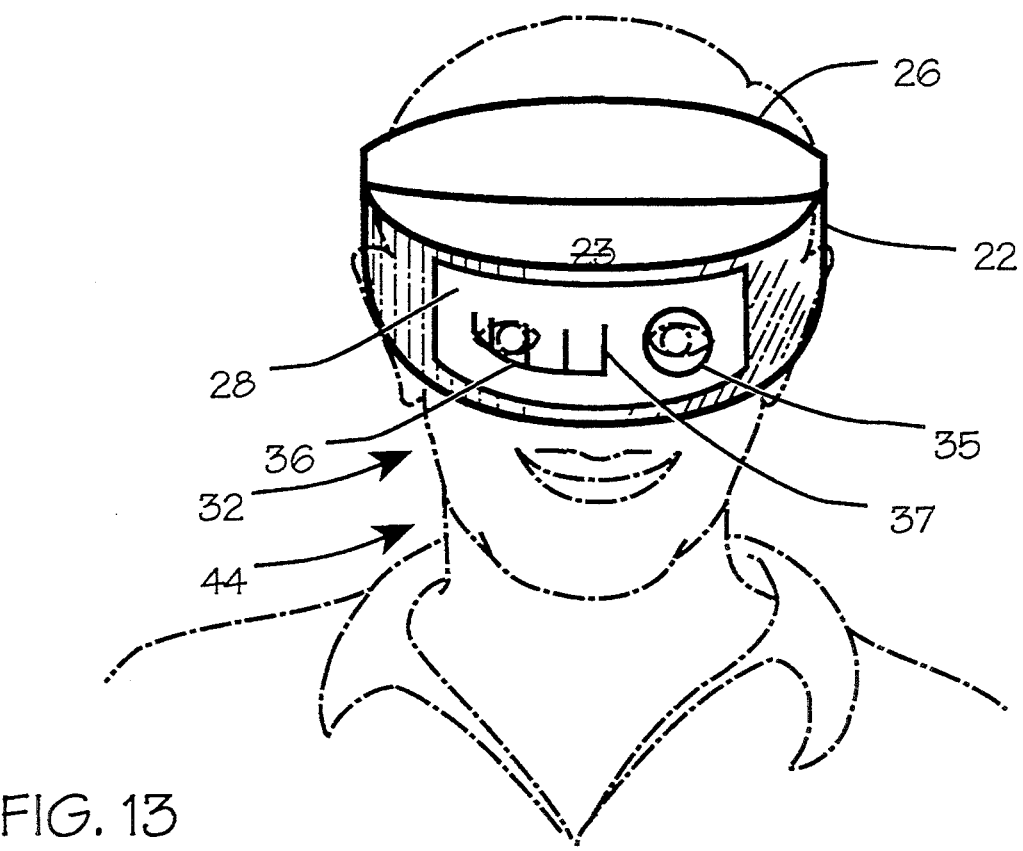
FIG. 13 is a front view of the head of a person wearing the golf training apparatus of FIG. 1.
Figure 14:
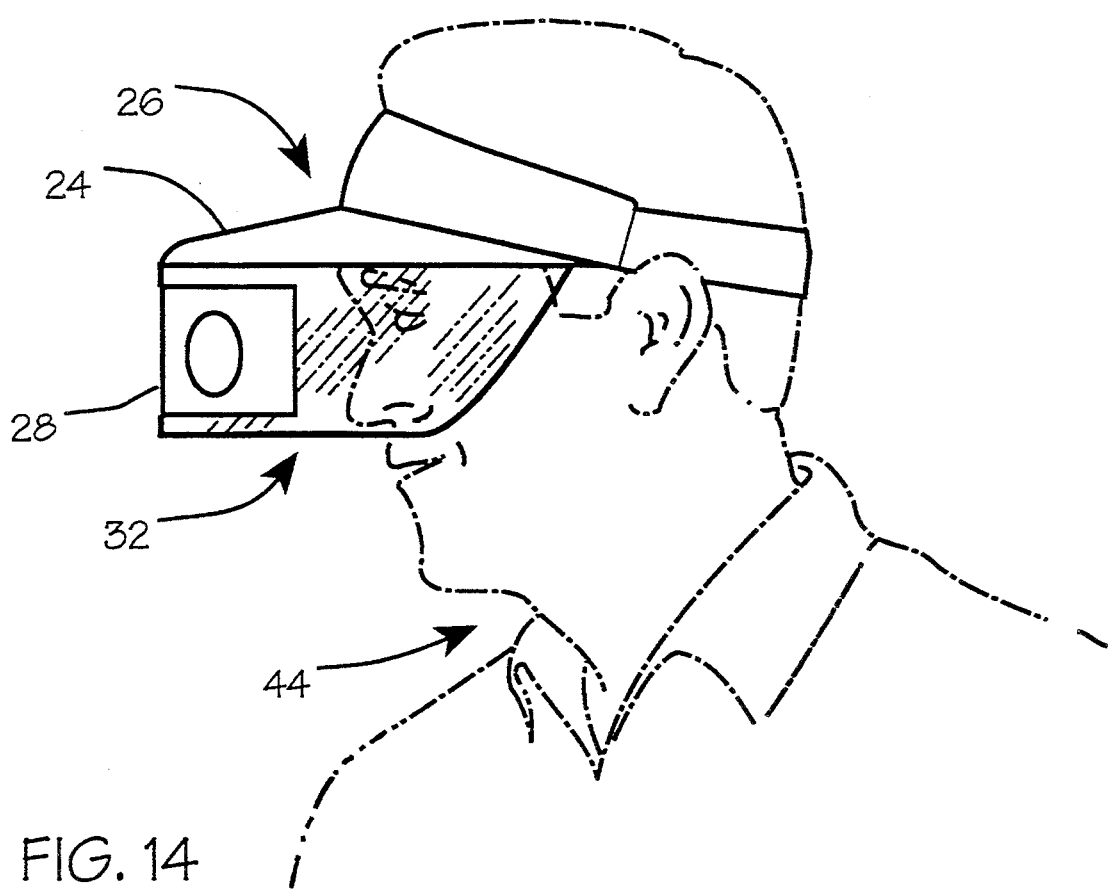
FIG. 14 is a side view of the head of the person wearing the golf training apparatus of FIG. 1.

Referring now to FIGS. 13 and 14, for further details, and to demonstrate the orientation of the shield with respect to the head of the golfer 44, the shield 22 has been drawn as a generally transparent member. FIG. 13 is a front view and FIG. 14 is a side view to illustrate the dimension and position of the shield 22. The width of the shield 22 is sufficient to wrap around the eyes but forward of the ears. The height of the shield 22 extends slightly below the nose of the user 44. Since the shield 22 follows the periphery of the brim 24 of the visor 26, there is sufficient space between the inner surface of the shield 22 for the user 44 to wear prescription eyeglasses.

The front view of the device 20 shows the relationship of the window 28 to the eyes of the user 44 and the position of the circle 35 overlying the left eye, with the matrix of lines 35-41 extending from the left side of the bridge of the nose to the other side of the right eye.

The upper and lower edges of the window 28 are parallel lines, with the upper edge generally parallel to the edge of the brim 24. These horizontal lines can be used for aligning the head to a parallel line needed to set the shoulders on a line related to the fairway, green or target area. The circle 35 is placed directly in front of the left eye by looking straight forward. When this is done the lines on both sides of the rectangular window 28 can be used to align the feet by bringing the head straight down and placing the inside of the feet in the peripheral vision with the lines as a guide. This will automatically set the proper distance between the feet. When this is done, the shoulders, feet and head are not aligned properly.

The last check point is the hands. The first, or longest, line 37 of the graduated vertical lines is used to set the hands in the proper position. As the golfer 44 looks down, the first line 37 should be placed on the outside of the right hand and this will align the hand position.

The circle 35 in the shield 22 is so placed to cause the eye to focus on that circle or the object, such as the golf ball 46, in the circle. This automatically trains the head to stay still because if you lose the object in the circle you are out of the proper position and you will stop your swing. When the back swing starts and the head moves professional teachers tell the student to coil his body rather than twist. When the body is coiled, the right knee is inside the stance. If that knee is not inside the stance you cannot coil the body without moving the head. The shield 22 with its graphic display promotes discipline in club head take away during the vital initial movement of the swing of the golfer.

FIG. 5 shows the field of view of the user at address position with the golf ball 46 concentrically positioned within the circle 35 of the display 30. The head 48a of the golf club 48 is shown at address position. The rectangular field of the display 30 is assumed to be horizontal in the left to right direction, as a consequence of which the terminal ends of the vertical lines 37-41 define a plane or line. The lower line 36 defines an inside out plane. Upon take away of the club head 48a from the golf ball 46, the golfer follows the straight plane defined by lines 37-41 a short distance in the direction away from the ball 46 to provide a smooth take away. On reversing the club movement to hit the ball 46, the club head 48a follows an inside out plane, that is, the head travel is toward the ball 46 along the line 36. Thus, with proper training of the non-dominant eye, the golfer can concentrate the left eye on the ball 46 by placement within the circle 35 during the entire golf swing.

While the apparatus 20 has herein been described with reference to golf sight training, its use is equally applicable in other areas where eye dominance is required, such as for use by a baseball pitcher. When he gets to the wind up position for releasing the ball, his left shoulder is pointing towards the target. If he is right handed and right eye dominant, the angle of trajectory would be slightly out of line as he would see the target with his right eye, and the timing for release may cause him to lose the line of correct sight. The present invention could also be used by a batter if seeing the ball is a problem. The more a batter would train his eyes the more he could see, especially with respect to the factor of speed of the ball. The circle would train the eyes to pick up the ball faster as training with the apparatus 22 would continue.

In basketball a person using two hands to shoot might not need eye dominance, but the object of the basket in the circle would tend to make his depth of field better and the brain would computed what the eyes see because they are directed to a specific motion. The present invention may be used in any situation where eye dominance is needed, and its use would provide the proper feedback to the person using the device.

While there has been shown and described a preferred embodiment, it is to be understood that various other adaptations and modifications may be made without departing from the spirit and scope of the invention.

What is claimed is:

1. A training apparatus to teach eye dominance for any application where eye dominance is required with respect to an object, the apparatus comprising:
   a shield member configured and positioned for viewing therethrough by a user;
   generally transparent window means on said shield member, said window means being dimensioned for placement in the viewing area of the user;
   a first reference means within said window means and positioned for viewing and focusing on the object through one eye of the user;
   a second reference means within said window means and positioned for viewing the object through the other eye of the user, said second reference means providing a point of reference relative to the object during movement of the user, said second reference means including a first inclined line for use as a reference adapted for establishing a path of movement for the user relative to said object while said first reference means provides a point of focus on the object for the user.

2. The apparatus of claim 1 wherein said first reference means is a circle.

3. The apparatus of claim 1 wherein said second reference means is a matrix of lines.

4. A training apparatus to teach eye dominance for the sport of golf where eye dominance is required with respect to a golf ball, the apparatus comprising:
   a shield member configured for attachment to the brim of a cap or sun visor to be worn on the head of a user;
   generally transparent window means on said member, said window means being dimensioned for placement in the viewing area of the user;
   a generally circular first reference means within said window means and positioned for viewing and focusing on the golf ball through one eye of the user;
   a second reference means within said window means and positioned for viewing the golf ball through the other eye of the user, said second reference means providing a point of reference relative to the golf ball during movement of the user, said second reference means being configured for establishing a line of movement for the user while said first reference means provides a point of focus on the golf ball for the user; and
   said second reference means includes a first inclined line for use as a reference for movement of the head of a golf club relative to the golf ball.

5. The apparatus of claim 4 wherein said window means is generally transparent and the balance of said shield member is generally opaque.

6. The apparatus of claim 3 wherein said window means is generally rectangular with the upper and lower edges thereof generally parallel and positioned for establishing a plane of reference with respect to the terrain on which the user is standing.

7. A training apparatus to teach eye dominance for any sport or application where eye dominance is required with respect to an object, the apparatus comprising:
   a shield member configured for attachment to the brim of a cap or sun visor to be worn on the head of a user;
   generally transparent window means on said member, said window means being generally rectangular with the upper and lower edges thereof generally parallel and dimensioned and positioned for placement in the viewing area of the user to establish a plane of reference with respect to terrain on which the user is standing;
   a first generally circular reference means within said window means and positioned for viewing and focusing on the object through one eye of the user;
   a second reference means within said window means and positioned for viewing the object through the other eye of the user, said second reference means providing a point of reference relative to the object during movement of the user, said second reference means being configured as a matrix of lines for establishing a line of movement for the user while said first reference means provides a point of focus on the object for the user.

8. The apparatus of claim 7 wherein said second reference means includes a first inclined line adapted for use as a reference for movement of the user relative to the said object.

9. The apparatus according to claim 8 wherein said second reference means includes a plurality of equally spaced lines orthogonal to said first line, said spaced lines adapted for providing a reference for speed of movement of the user relative to said object.

10. The apparatus of claim 9 wherein said window means is generally transparent and the balance of said shield member is generally opaque.

11. The apparatus of claim 10 wherein said window means is generally rectangular with the upper and lower edges thereof generally parallel and positioned for establishing a plane of reference with respect to terrain on which the user is standing.

12. A training apparatus to teach eye dominance for a golfer in addressing and swinging relative to a golf ball, the apparatus comprising:
   a shield member configured for attachment to the brim of a cap or sun visor to be worn on the head of a user;
   generally rectangular generally transparent window means on said member, said window means being dimensioned for placement in the viewing area of the user;
   a circular reference means within said window means and positioned for viewing and focusing on the golf ball through one eye of the user;
   a matrix of lines as a second reference means within said window means and positioned for viewing the object through the other eye of the user, said matrix including a first line slightly inclined relative to a horizontal direction for providing a point of reference during movement of a golf club by the user, said matrix of lines being configured, placed and dimensioned for establishing a reference line of movement for the user while said circular reference means provides a point of focus on the ball for the user.

13. The apparatus of claim 12 wherein said matrix includes a plurality of equally spaced lines orthogonal to said first line, said spaced lines providing a reference for speed of take away movement of a golf club head.

14. The apparatus of claim 13 wherein said window means is generally transparent and the balance of said shield member is generally opaque.

15. The apparatus of claim 14 wherein said window means is generally rectangular with the upper and lower edges thereof generally parallel and positioned for establishing a plane of reference with respect to terrain on which the user is standing.

16. A training apparatus to teach eye dominance for a user in addressing and effecting movement relative to an object, the apparatus comprising:
  head gear to be worn on the head of a user and including a brim portion for positioning above and forward of the eyes of the user;
  an elongate shield member having a generally rectangular generally transparent window means on said member;
  matingly coacting means on an edge of said member and on the under surface of said brim portion for attaching said shield member thereto with said window means being dimensioned for placement in the viewing area of the user and focusing on the object through one eye of the user;
  a circular reference means within said window means and positioned for viewing and focusing on the object through one eye of the user;
  a matrix of lines as a second reference means within said window means and positioned for viewing the object through the other eye of the user, said matrix including a first line slightly inclined relative to a horizontal direction adapted for providing a point of reference during movement relative to said object by the user, said matrix of lines being configured, placed and dimensioned for establishing a reference line of movement by the user relative to the object while said circular reference means provides a point of focus on the object for the user.

17. The apparatus of claim 16 wherein said matrix includes a plurality of equally spaced lines orthogonal to said first line, said spaced lines being graduated in length and adapted for providing a reference for speed of take away movement relative to said object.

18. The apparatus of claim 17 wherein said window means is generally transparent and the balance of said shield member is generally opaque.

19. The apparatus of claim 16 wherein said circular reference means and said matrix are formed on a decal attached to said shield member.

20. The apparatus of claim 16 wherein said window means is generally rectangular with the upper and lower edges thereof generally parallel and positioned for establishing a plane of reference with respect to terrain on which the user is standing.

21. The apparatus of claim 16 wherein the diameter of said circular means is of a dimension sufficient to enable the user to view the object concentrically positioned therein.

22. The apparatus of claim 16 wherein said matingly coacting means includes an enlarged upper edge of said shield member and an attachment member for securing to the brim portion and having a matingly configured channel means for slidably receiving said enlarged upper edge.

23. The apparatus of claim 16 wherein said first line is inclined upwardly in a direction from the nose of the user toward the ear of the user and adapted to teach take away movement relative to said object for an outside to inside direction.

24. The apparatus according to claim 16 wherein said shield member is dimensioned to wrap around the user's face in front of the eyes and continue to a point proximate the ear, but not lower than the bottom of each ear and not lower than the bottom of the nose in the front of the face.

25. The apparatus of claim 16 wherein said shield member is formed from a clear piece of plastic material stock.

26. The apparatus according to claim 24 wherein said shield member is configured such that, when attached to said brim portion, it allows enough room between the face and the shield in order to accommodate any eye wear, corrective or otherwise, that the user may wear.

27. The apparatus according to claim 17 wherein each line of said graduated lines is shorter in length the greater the distance from the circular reference means.

28. A training apparatus to teach eye dominance for a user in addressing and effecting proscribed movement relative to a selected object, the apparatus comprising:
  a shield member configured for attachment to the brim of a cap or sun visor to be worn on the head of a user;
  generally transparent window means on said shield member, said window means being dimensioned for placement in the viewing area of the user;
  a generally circular reference means within said window means and positioned for viewing and focusing on said selected object through one eye of the user;
  a matrix of lines as a second reference means within said window means and positioned for viewing the object through the other eye of the user, said matrix including a first line for providing a point of reference during said proscribed movement by the user, said matrix of lines being configured, placed and dimensioned for establishing a reference line of movement for the user while said circular reference means provides a point of focus on the said object for the user.

* * * * *